Oct. 23, 1934.  H. J. MURRAY  1,977,887
CIRCUIT CONTROLLING DEVICE
Filed July 18, 1924
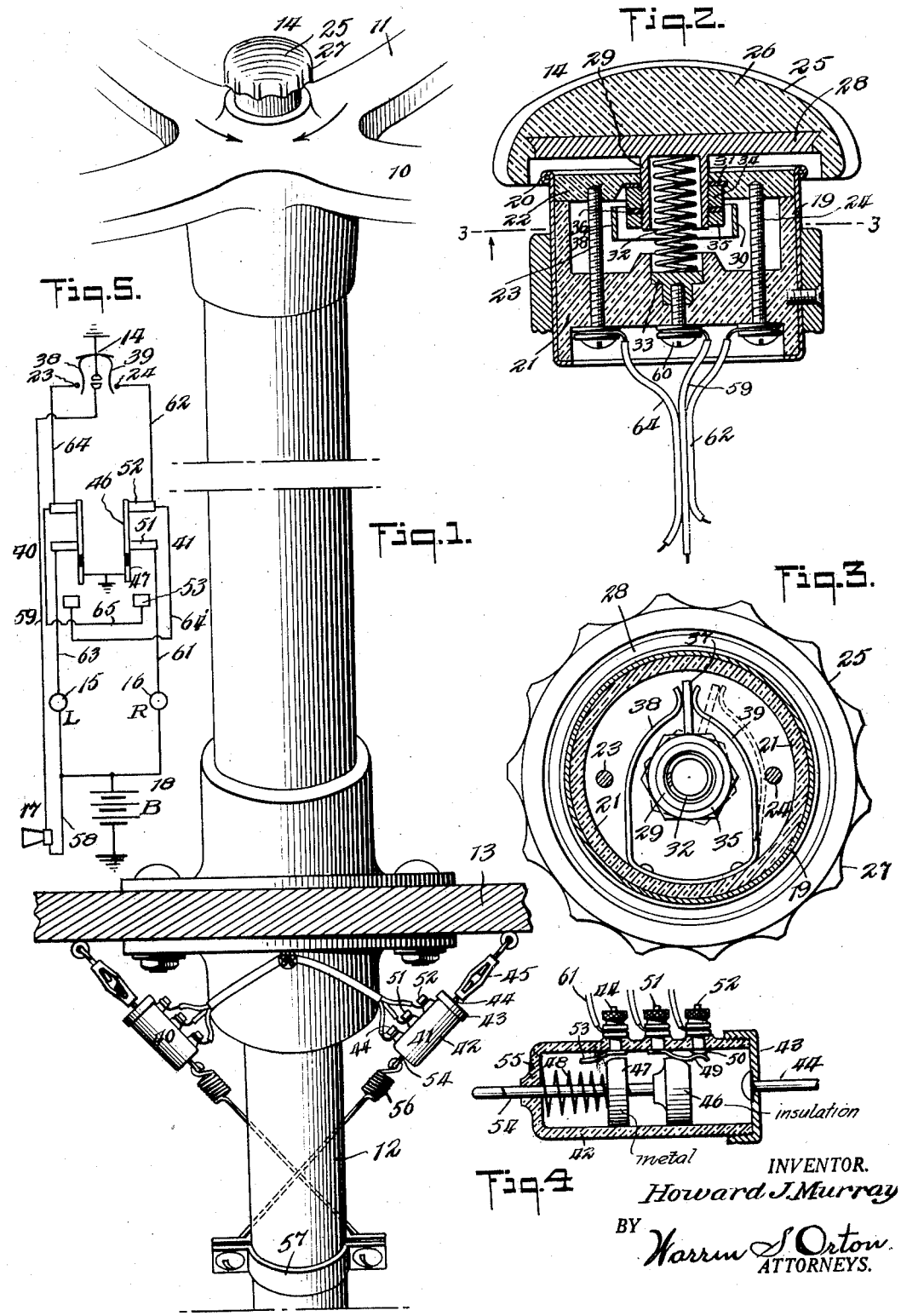
INVENTOR.
Howard J. Murray
BY Warren S. Orton
ATTORNEYS.

Patented Oct. 23, 1934

1,977,887

UNITED STATES PATENT OFFICE 1,977,887

CIRCUIT CONTROLLING DEVICE

Howard J. Murray, New York, N. Y., assignor to R. M. Company, Inc., East Pittsburgh, Pa., a corporation of Delaware Application July 18, 1924, Serial No. 726,650

3 Claims. (Cl. 177—337)

The invention relates to a signalling device of the type commonly found on automotive vehicles for the purpose of indicating the intent of the operator to turn to the right or left and the invention specifically relates to a compound circuit closer forming the manually actuated control for the electric circuits containing such signal devices and forming a control actuated by the disposition of the steering mechanism in its movements to steer the vehicle to close the circuit through either a right or left indicating signal device.

The primary object of the invention is to provide a simplified form of circuit controlling device for use in a signalling device organized to cause an incorrectly given manual signal indication given before the turn is made to be extinguished.

Another object of the invention is to provide a simplified form of circuit breaker in each of the right and left signal circuits which will close the proper circuit by the rotary movement in either direction of the steering mechanism and which will automatically restore both the right and left signal circuits to their initial condition when the steering mechanism is disposed to cause a forward, straight driving of the vehicle.

Various other objects and advantages of the invention will be in part obvious from an inspection of the accompanying drawing and in part will be more fully set forth in the following particular description of one form of mechanism embodying my invention, and the invention also consists in certain new and novel features of construction and combination of parts hereinafter set forth and claimed.

In the accompanying drawing:—

Figure 1 is a plan view looking down upon a steering column of an automotive vehicle and showing the column equipped with a preferred embodiment of the invention;

Figure 2 is an enlarged vertical sectional view taken axially through the push button shown at the center of the steering wheel in Figure 1;

Figure 3 is a substantially horizontal transverse sectional view taken on the line 3—3 of Figure 2 looking in the direction indicated by the arrow;

Figure 4 is an enlarged detailed view taken axially through one of the plunger switches shown in Figure 1; and Figure 5 is a diagrammatic view showing certain of the parts in the preceding figures together with their electric connections.

In the drawing there is shown part of a steering wheel 10 with spokes 11 mounted on the rotatable steering column 12 and which column is journalled for rotary movement in a support 13. It will be assumed that the vehicle is provided with some suitable form of direction indicators herein shown to be of an electrically actuated type and controlled selectively and manually by a circuit closer 14. There is shown diagrammatically in Figure 3 a left indicating signal 15, a right indicating signal 16, a horn 17, all supplied from one side of a battery or other source of energy 18, the other side of which source is grounded on the machine.

Referring specifically to the push button control switch 14 it is intended that the same be marketed as a unit together with the necessary attaching means and in general it is intended that the design correspond to the usual horn button mounted at the center of the wheel where the spokes intersect. The circuit closer 14 includes an outlining open end cylindrical shell 19 formed of metal and grounded on the metallic frame of the machine. The upper edge of the shell is beaded as shown at 20 to provide a fixed continuous grounding contact.

Positioned within the shell is a two-part insert comprising a hollow main body portion 21 and a top cover plate portion 22 demountably secured together by a pair of long screws 23 and 24, hereinafter identified as fixed contacts for the direction indicator circuits. Positioned on top of the parts thus described is a manually actuated push button 25. This push button includes a top handle portion 26 formed of insulating material and having its periphery corrugated as shown at 27 to facilitate the rotary movement of the button hereinafter described. The top portion 26 is provided on its underside with a flat contact plate 28 which is molded into the composition of the handle 26 and has its underside exposed. The exposed side faces and is designed to be moved into electric contact with the edge 22 of the grounded plate in all rotatable positions of the button 25. The button 25 is mounted for both rotary and axial movement and for this purpose the plate 28 is provided centrally thereof with a depending guiding sleeve 29 intruded into the hollow chamber 30 of the body portion 21 through a guiding aperture 31 formed in the cover plate 22.

The sleeve 29 also provides a housing for a compression spring 32 extending between the plate 28 and a contact plate 33 embedded in the body portion 21 of the insert in the act of molding the same.

The intruded, lower end of the sleeve 29 is externally threaded for receiving a pair of nuts 34 and 35 between which is secured a plate 36 carrying a laterally extending contact finger 37 as more particularly shown in Figure 3. The contact finger 37 extends between the free end of a pair of ogee retractile springs 38 and 39. These springs are secured to the body portion 21 of the insert and are designed when distorted by the finger 37 to engage respectively with the fixed contacts 23 and 24, depending on the direction of rotation of the button. It will be understood from this construction that depressing the button 25 causes the plate 28 to ground on the shell 19 to sound the horn, and that the rotation of the button 25 clockwise will cause the finger 37 to shift the spring 39 from the full line into the dotted line position shown in Figure 3, and until the spring 39 engages the fixed member 24 to complete the circuit through the right signal 16 as hereinafter described. Correspondingly the turning of the button in the opposite, or anti-clockwise, direction will cause the spring 38 to engage the contact 23 and close the circuit through the left signal 15. The springs 38 and 39 are of sufficient strength when free of the manual force of the operator to react upon the finger 37 and act therethrough to re-rotate the button into its normal circuit interrupting position.

In addition to the manually actuated circuit closer thus described each of the right and left indicating signal circuits includes an additional circuit closer controlled automatically by the steering movement of the column 12. For this purpose there is positioned between the column 12 and the support 13 a pair of plunger switches 40 and 41, one for each of the circuits. As these switches are similar in construction the detailed description of either one will suffice for the other.

Each switch comprises a plunger cylinder 42 with one end closed by a cap 43 and from which cap extends a rod 44 adjustably secured to the support 13 by means of a turnbuckle 45. Slidably mounted within the cylinder is a two headed plunger, one of the heads 46 being formed of fibre or other non-conducting material and the other head 47 being formed of a conducting material. The heads are maintained in distended position relative to the cylinder by means of a spring 48, housed in the cylinder and fitting between the head 47 and the adjacent end of the cylinder. The head 46 is designed to be moved into engagement with a spring contact 49, to force the same from an inoperative, open circuit position into circuit closing engagement with a fixed contact 50. The contacts 49 and 50 are respectively connected electrically to binding posts 51 and 52 carried by the side of the cylinder 42. The metallic head 47 is designed to engage a spring contact 53 forming part of a binding post 44 also carried by the cylinder 42. When the plunger is moved to the left of the showing in Figure 4 the engagement of the plunger head 47 with the spring contact closes one of the signal circuits and opens the other similar circuit. The plunger rod 54 extends through an opening in the closed end 55 of the cylinder and is connected through a coil spring 56 with one side of a bracket ring 57 secured to the steering column 12 and rotating therewith.

It is understood from the showing in Figure 1 that the spring conections 56 connected to the switches 40 and 41 crossing each other and extend in opposite directions about the steering column and the parts are so disposed that with the steering column in its position to cause a straight forward movement of the vehicle, the plungers are in the position shown in Figure 2, with the circuit normally closed through the contacts 49 and 50 and with the circuit opened at contact 53. The rotary movement of the steering column in effecting a steering of the vehicle in one or the other direction will tend to elongate the distance along one of the switch connections between the support 13 and the bracket 57 which elongation in the case of one of the plunger switches will shift the heads to the left in the position shown in Figure 4, interrupt one of the circuits at the switch contacts 49 and 50 and ground the other signal circuit by the engagement of the metal head 47 with the spring contact 53.

Referring particularly to Figure 5 there is disclosed a horn circuit leading from one side of the battery and including a conductor 58, horn 17, conductor 59, leading to a contact button 60 positioned centrally on the underside of the body portion 21 and connected mechanically and electrically with the spring engaged button 33.

From this construction it will be obvious that the depressing of the plate 28 into engagement with the grounding shell 19 will complete the circuit from the battery through the horn and ground the same on the metal part of the structure.

Referring to Figure 5 there is disclosed a right signal circuit which extends from the ungrounded side of the battery through the right signal 16, through conductor 61 to contact post 51 on plunger switch 41. From contact post 52 conductor 62 leads to the fixed contact screw 24 in the manual switch 14. Similarly a left signal circuit extends from the ungrounded side of the battery, through left signal 15, through conductor 63 to the other post 51 in the plunger switch 40 and conductor 64 connects contact post 52 with the fixed screw contact 23 in the manual switch 14. A shunting conductor 64' connects post 52 in switch 41 with contact 53 in switch 40 and similarly a shunting conductor 65 connects contact 53 in switch 41 with contact 52 in switch 40.

In operation and with the steering mechanism in its normal straight forward driving position, it will be understood that the right and left signal circuits are under the sole control of the manually actuated switch. Under these conditions the circuit is closed through the contacts 49 and 50 in both plunger switches; the circuits are both normally opened at the manual switch 14 and are closed selectively by the rotation of the button 25.

Should the steering mechanism be turned the plunger switch on the side towards which the turning movement is made, will simply hang slack and the several contacts carried thereby will remain in their normal position. The parts forming the plunger switch on the side away from which the turning movement is made will be elongated, the spring 48 compressed, the circuit broken between contacts 49 and 50, and grounded by the engagement of the metal head with the grounding contact 53. This will have the effect of closing the circuit through the indicating signal on the side towards which the vehicle is turning and opening the circuit containing the other signal thus rendering the manual switch inoperative. By means of the device disclosed it is apparent that any accidental movement of the manual switch during the turning of the vehicle has no effect on the signalling device. The manual control switch when not positively held by the operator's hand on its right or left hand signalling position is returned automatically to its neutral position. The proper signal may be given prior to the turn, is maintained automatically during the turn and is extinguished automatically when the car is straightened out. In this way the turning of the steering mechanism will cause the proper signal to function automatically and independently of any actuation of the manual control switch. Further the proper signal will function along and the improper signal will not be actuated even though, during the turning movement, the operator accidentally turns the push button in the wrong direction.

With the restoration of the steering mechanism into its normal position the springs 48 in the plunger switches automatically return the parts to their normal position.

By properly adjusting the turn buckles 45 and varying the type of spring 56 employed, the points at which the automatic actuation of the signals becomes operative may be changed at will, so as to permit the slight turnings of the steering mechanism in both directions incidental to a straight forward movement, without causing the signals to function and for varying the actuation of the signals until a present angular change is made by the steering mechanism.

Further the angle of turn necessary to effect the signals may be varied relative to each other so that a turn in one direction, as to the left, may be delayed until the vehicle has completed a greater angle of turn than is required to actuate the signal when the turn is made to the right.

While I have shown and described and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:—

1. A circuit controlling device comprising a cylinder formed of insulating material, three electric contacts within the cylinder, one of said contacts being a spring and adapted to be moved into engagement with another of the contacts to form a circuit closer, a two headed plunger slidably mounted in the cylinder, one of said heads being of insulating material and adapted to bear on said two first named contacts to maintain said circuit closer normally in closed position, the other head being of conducting material and adapted to engage the third contact to form a second circuit closer and a biasing spring operative between the plunger and cylinder and acting normally to cause the insulating head to close the first named circuit closer and to space the metallic head from its associated contact, and means for shifting the plunger against the action of said biasing spring to permit the first named circuit closer to open and to close the second circuit closer.

2. In an automobile signalling system, the combination with an automobile provided with a steering wheel, a right and a left hand electrically operated direction signalling device, of means forming two electric circuits, with one of said devices included in each circuit, a single manually actuated switch mounted centrally on top of the steering wheel, normally biased to its neutral position, adapted to be returned to said neutral position when not positively held in either of its circuit closing positions and operatively connected for selectively closing the circuit through either one of said circuits while breaking the circuit through the other whereby one of said devices is caused to become active while the other is disposed in an inactive condition, a pair of automatic circuit control devices, each consisting of two relatively movable elements and means coacting to form two circuit closers, one of said circuit closers being normally open and the other circuit closer being normally closed, said normally closed circuit closer including means for moving it automatically into open, circuit breaking position when free of restraint, a spring acting between the elements and acting thereon normally to maintain said other circuit closer in its circuit closing position resisting its tendency to open, mechanism controlled by the turning of the steering wheel into a position to turn the vehicle operatively connected to both of said control means for shifting the elements of each against the action of its associate spring simultaneously to permit each of said other circuit closers to move into open circuit breaking position and to close the normally open circuit closers, one of the elements of each of the normally open circuit closers being connected electrically with that one of the normally closed elements which is connected to the manually actuated switch, whereby either device which may be functioning by virtue of the closing of its circuit manually is rendered inoperative automatically and the same or the other device rendered operative by virtue of the action of said turning mechanism independently of the previous position of the manually actuated switch whereby a signal may be given manually prior to the turn, maintained automatically during the turn and extinguished automatically upon straightening out of the vehicle after the turn.

3. In an automobile signalling system, the combination with an automobile provided with a steering wheel, and a right and a left hand electrically operated direction signalling device, of means forming two electric circuits including two sets of four contacts, and with one of said devices included in each circuit, a single, manually-actuated two position switch mounted on top of the center of the steering wheel, normally biased to its neutral position, adapted to be returned to said neutral position when not positively held in either of its circuit closing positions and one contact of each set constituting the fixed contacts of said manually actuated switch, two other of each of said sets of contacts constituting a second and third contact connected electrically to each other and to their associated fixed switch contact, each of said signalling devices connected to each of the fourth contacts of each set, a pair of sliding elements, each adapted to have two operative positions disposed in one position normally electrically connecting the second and fourth contacts to complete the circuit between the associated fixed switch contact and the signal device controlled thereby, and when disposed in another position connecting its fourth contact with the third contact of the other set, a spring acting on the sliding elements and tending to maintain them in their normal position and means actuated by the turning of the steering column for shifting said sliding elements against the resistance of their springs, whereby a signal may be given manually prior to the turn, maintained automatically during the turn and extinguished automatically upon straightening out of the vehicle after the turn.

HOWARD J. MURRAY.